March 18, 1924.
J. H. FREEZE
GATE VALVE
Filed Aug. 7, 1922
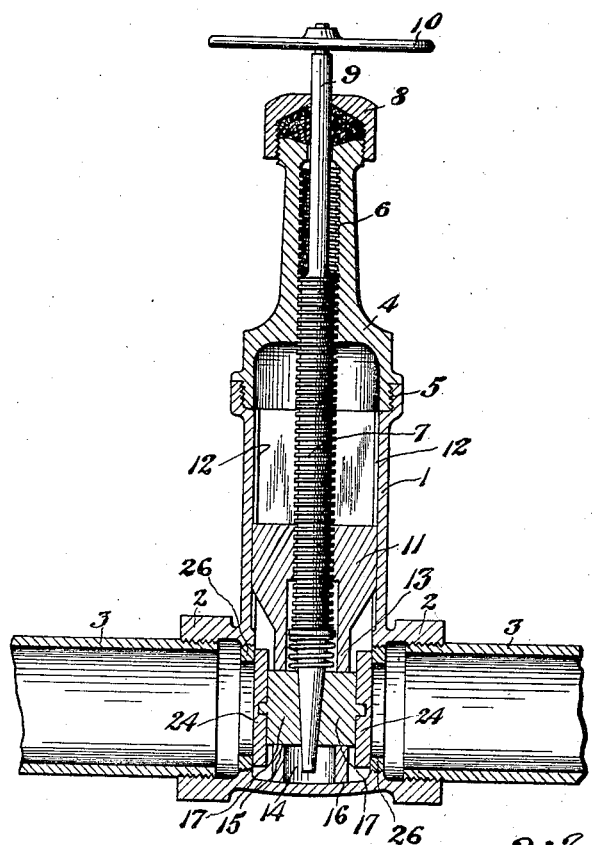
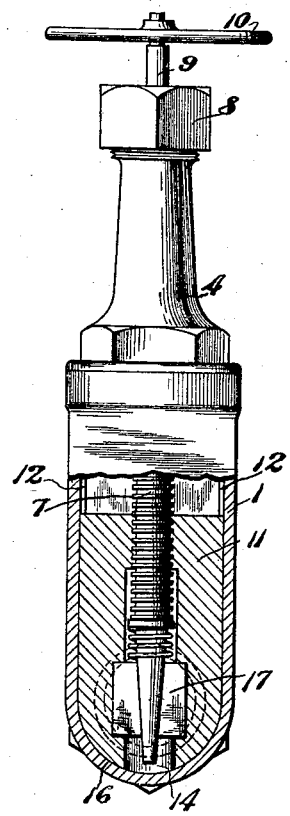
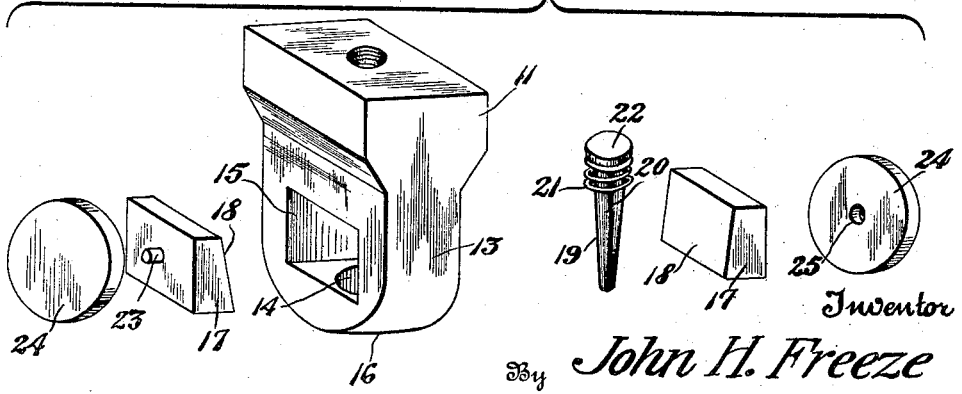
Inventor
By John H. Freeze
Attorneys Patented Mar. 18, 1924.

1,487,553

UNITED STATES PATENT OFFICE.

JOHN H. FREEZE, OF NORTH CANTON, OHIO.

GATE VALVE.

Application filed August 7, 1922. Serial No. 580,078.

*To all whom it may concern:*

Be it known that I, JOHN H. FREEZE, a citizen of the United States, residing at North Canton, in the county of Stark and State of Ohio, have invented a new and useful Gate Valve, of which the following is a specification.

This invention relates to valves and more particularly to a double gate valve, and has for its objects to provide a valve of this character in which a nut carried upon the threaded valve stem houses a pair of slidable wedge blocks operated by a wedge pin controlled by the threaded valve stem, a valve disk being rotatably mounted upon each of said wedge blocks.

The above and other objects may be attained by constructing the valve as illustrated in the accompanying drawings, in which—

Figure 1 is a vertical sectional view through a valve embodying the invention;

Fig. 2, a section on the line 2—2, Fig. 1; and

Fig. 3, a detail perspective view of the nut and associated parts separated.

Similar numerals of reference indicate corresponding parts throughout the drawing.

The casing is shown at 1, and may be of usual construction, provided near one end with the transversely disposed, threaded ports 2, to which the pipes 3 are connected in the usual manner, one of said pipes providing an inlet to the valve casing, the other being an outlet therefor.

The bonnet 4 of the casing is preferably connected to the upper, open end of the body portion 1 as by the screw threads 5 and is provided with the internal threads 6 for engagement with the threaded valve stem 7.

A packing box, as shown at 8, may be provided upon the upper end portion of the bonnet to receive the smooth portion 9 of the valve stem, and the usual hand wheel 10, or other suitable means, is provided upon the upper extremity of the valve stem for rotating the same.

The nut 11, is mounted upon the lower end portion of the threaded valve stem and is mounted to slide vertically in the guides 12 formed in the side walls of the body 1 of the casing.

A reduced, downward extending, hollow portion 13 is formed upon the nut 11, provided with the vertical bore 14 which communicates, intermediate its ends with the transverse, rectangular cross-sectional channel 15, the lower end of the nut being preferably rounded to fit the lower wall of the casing as shown at 16.

A pair of wedge blocks 17, are loosely mounted in opposite end portions of the transverse channel 15, the inner inclined faces 18 of said blocks engaging the flat faces 19 of the tapered pin 20, which is normally urged toward the lower end of the valve stem by the coil spring 21 interposed between the upper faces of the wedge blocks and the head 22 of the pin.

Each of the wedge blocks is provided upon its outer side with a boss 23 upon which a valve disk 24 is journaled as by the concentric socket 25 therein. The valve seats 26 which the valve disks are arranged to engage, are preferably replaceable as shown, being threaded, or otherwise connected to the casing.

The operation of the valve is as follows: Assuming the parts to be in the position shown in Figs. 1 and 2, the first movement of the valve stem to open the valve will, as the thread turns in the nut 11, withdraw the stem from engagement with the head of the tapered pin 20, allowing the spring 21 to raise the pin and permitting the wedge blocks to move loosely in the channel 15 of the nut.

At the same time the nut will be moving upward, due to the threaded stem working in the fixed threads 6, and as the rotation of the stem in this direction is continued, the nut will be raised in the casing, moving the disks out of the path of the incoming fluid.

To close the valve, the stem is turned in the opposite direction, moving the nut down to the bottom of the casing and a continued turning of the stem moves the lower end of the same into engagement with the head of the pin 20, forcing the same down and in turn forcing the wedge blocks outward, the disks carried thereon being forced into engagement with the valve seats, tightly closing the valve.

It will be evident that the disks are free to rotate upon the wedge blocks when the valve is in the open position, thus permitting the disks to always seat properly. In the event that any dirt is deposited upon one of the valve seats, the disks being free to turn, will remove the dirt as they are moved to the closed position.

By providing the spring between the wedge blocks and the head of the tapered pin, the disks will be quickly unseated upon the first movement of the stem to open the valve, permitting the nut to be easily raised into the open position.

I claim:—

1. In a valve of the character described, the combination of a casing, a valve stem threaded therein, a nut upon the inner end portion of the valve stem, a pair of wedge blocks mounted for transverse sliding movement in the nut, a disk rotatably mounted upon each wedge block and a tapered pin within the nut engaging the wedge faces of the wedge blocks and arranged to be engaged by the threaded stem, and a spring for urging the tapered pin toward the threaded stem.

2. In a valve of the character described, the combination of a casing, a valve stem threaded therein, a nut upon the inner end portion of the valve stem, a horizontal square opening through the lower portion of the nut, a pair of square blocks slidably mounted in said square opening and provided with inclined inner faces, a disk rotatably mounted upon each block, a tapered pin slidably mounted within the nut and arranged to be engaged by the lower end of the threaded stem, said pin having flat faces arranged to engage the inclined faces of the blocks, and a spring for urging the tapered pin toward the threaded stem.

JOHN H. FREEZE.